US011431011B2

United States Patent
Kancsár et al.

(10) Patent No.: US 11,431,011 B2
(45) Date of Patent: Aug. 30, 2022

(54) REGULATION OF A CONTROLLED VARIABLE OF A CONDITIONING UNIT OF A REACTANT OF A FUEL CELL WITH ASCERTAINMENT OF AN ACTUAL VALUE OF THE CONTROLLED VARIABLE

(71) Applicant: AVL LIST GMBH, Graz (AT)

(72) Inventors: János Kancsár, Vienna (AT); Stefan Jakubek, Vienna (AT); Christoph Kügele, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 16/770,459

(22) PCT Filed: Nov. 30, 2018

(86) PCT No.: PCT/EP2018/083105
§ 371 (c)(1),
(2) Date: Jun. 5, 2020

(87) PCT Pub. No.: WO2019/110433
PCT Pub. Date: Jun. 13, 2019

(65) Prior Publication Data
US 2021/0167407 A1    Jun. 3, 2021

(30) Foreign Application Priority Data

Dec. 5, 2017    (AT) .............................. A 51007/2017

(51) Int. Cl.
*H01M 8/04*    (2016.01)
*H01M 8/04992*    (2016.01)
(Continued)

(52) U.S. Cl.
CPC ... *H01M 8/04992* (2013.01); *H01M 8/04089* (2013.01); *H01M 8/04708* (2013.01);
(Continued)

(58) Field of Classification Search
CPC ......... H01M 8/04992; H01M 8/04089; H01M 8/04708; H01M 8/04753; H01M 8/04835
See application file for complete search history.

(56) References Cited

U.S. PATENT DOCUMENTS

2003/0203253 A1* 10/2003 Clingerman ...... H01M 8/04559
429/432
2010/0233555 A1    9/2010 Zirkel et al.
(Continued)

FOREIGN PATENT DOCUMENTS

DE    102013001413 A1    10/2013

*Primary Examiner* — Olatunji A Godo
(74) *Attorney, Agent, or Firm* — Dykema Gossett PLLC

(57) ABSTRACT

Various embodiments of the present disclosure are directed to methods and systems for determining at least one actual value of a controlled variable of a conditioning unit for a reactant of a fuel cell. In one example embodiment, the method steps for determining the at least one actual value of a controlled variable includes: measuring a measured value of the actual value of the at least one controlled variable, calculating a model value of the at least one controlled variable using a model of the conditioning unit, calculating a model value of the actual value of the at least one controlled variable using a sensor model, calculating a correction value for the at least one controlled variable, and calculating the actual value of the at least one controlled variable as the sum of the correction value and of the model value of the at least one controlled variable.

9 Claims, 2 Drawing Sheets

(51) Int. Cl.
*H01M 8/04089* (2016.01)
*H01M 8/04701* (2016.01)
*H01M 8/04746* (2016.01)
*H01M 8/04828* (2016.01)
*H01M 8/10* (2016.01)

(52) U.S. Cl.
CPC ... *H01M 8/04753* (2013.01); *H01M 8/04835* (2013.01); *H01M 2008/1095* (2013.01)

(56) References Cited

U.S. PATENT DOCUMENTS

| | | |
|---|---|---|
| 2010/0324749 A1 | 12/2010 | Iwamoto et al. |
| 2016/0377330 A1 | 12/2016 | Burazer et al. |
| 2019/0245223 A1 | 8/2019 | Kügele et al. |

\* cited by examiner

REGULATION OF A CONTROLLED VARIABLE OF A CONDITIONING UNIT OF A REACTANT OF A FUEL CELL WITH ASCERTAINMENT OF AN ACTUAL VALUE OF THE CONTROLLED VARIABLE

CROSS-REFERENCE TO RELATED APPLICATIONS

This application is a national stage filing based upon International PCT Application No. PCT/EP2018/083105, filed 30 Nov. 2018, which claims the benefit of priority to Austria application No. A 51007/2017, filed 5 Dec. 2017.

BACKGROUND

The present invention pertains to a method for determining the actual value of at least one controlled variable of a conditioning unit for a reactant of a fuel cell, wherein a measured value of the actual value of the controlled variable being measured using a measuring sensor, and to an assembly for controlling a controlled variable of a reactant of a fuel cell in a conditioning unit for a reactant, wherein a measuring sensor being provided to measure a measured value of the actual value of the controlled variable, and a control unit is provided in which a controller is implemented, which compensates a deviation between a setpoint value of the controlled variable and the actual value of the controlled variable, and to corresponding control of a controlled variable of a conditioning unit of a reactant of a fuel cell.

The conditioning of the supplied gases (reactants), in particular with regard to temperature, humidity, pressure and mass flow, is of crucial importance for the proper and efficient operation of a fuel cell. Incorrect conditioning of the reactants can lead to a loss of performance or, in the worst case, to damage and destruction of the fuel cell or the fuel-cell stack. In particular, the relative humidity of the supplied reactants, such as oxygen, also in the form of the supplied air, is an important parameter in many fuel-cell types, such as in a proton exchange membrane fuel cell (PEMFC), which must be precisely controlled.

In order to be able to fully exploit the capabilities of a fuel cell, precise control of the conditioning of the reactants is required. This involves great effort, in particular in the case of transient and highly dynamic operation of the fuel cell. (Highly) dynamic or transient operation means in particular a rapid change in the output variables of the fuel cell (electrical voltage, electrical current). This is a problem in particular when developing a fuel cell on a test bench, where the aim is generally to subject the fuel cell to dynamic test runs (in terms of the rate of change of the output variables, but also the load of the fuel cell) in order to test or improve the behavior of the fuel cell. However, even during actual operation of the fuel cell, for example in a motor vehicle, the conditioning of the reactants must enable transient and highly dynamic operation of the fuel cell. Such rapid changes that the dynamic system does not reach a steady state, but rather the transient behavior between the changes is represented, are in particular understood to be dynamic.

For precise control of the conditioning of the reactants, it is necessary to detect actual variables of the controlled variables by measurement and to make them available to the control. This means that the measurement infrastructure (measuring sensors, measured-value processing, measured-value evaluation, etc.) must also be able to detect the actual variables in transient, highly dynamic operation, in which the measured variables can change very quickly and also very significantly. The requirements placed on the measurement infrastructure are therefore also high. This is made even more difficult by the fact that the measuring sensors that are used to detect the measured values are often influenced by the changing physical conditions (e.g. temperature, pressure, mass flow, humidity) themselves. Calibration of the measuring sensors is therefore only possible to a limited extent or is very complex. In addition, there are unavoidable dead times in detecting the measured values, i.e. a measured value is not available immediately but only after a certain period of time. All this leads to distortion of the measurement results achieved, which is why the measurement results achieved, especially in transient, highly dynamic operation, do not correspond with sufficient accuracy to the physical measurement variables that are actually occurring. This impairs the controllability of the conditioning of the reactants in the fuel cell. It has been found that the measurement of relative humidity is affected by this problem in particular.

Inaccurately measuring the actual variables can also lead to loss of performance or damage or even destruction of the fuel cell, in particular in transient, highly dynamic operation of the fuel cell.

SUMMARY OF THE INVENTION

The problem addressed by the present invention is therefore to provide a method and a device for determining at least one actual value of a controlled variable of a reactant of a fuel cell with the smallest possible measurement error in order for it to be possible to use the actual value in a control of the controlled variable.

This problem is solved in that a model value of the controlled variable is calculated using a model of the conditioning unit, a model value of the actual value of the controlled variable is calculated using a sensor model for the measuring sensor, a correction value is calculated for the controlled variable from the actual value of the controlled variable measured using the measuring sensor and the model value of the actual value of the controlled variable calculated using the sensor model, and the actual value of the at least one controlled variable is calculated as the sum of the correction value and the model value of the controlled variable calculated using the model of the conditioning unit, this actual value of the controlled variable also being used in the sensor model to calculate the model value of the actual value of the controlled variable.

This procedure allows the dependency of the measuring sensor on environmental conditions, such as pressure, humidity, mass flow, temperature, and thus also the sensor error in the transient behavior to be represented when determining the actual value of the controlled variable. This allows the sensor errors to be corrected and the quality of the actual value for the control to be increased. The biggest advantage is that the real actual value of the measured variable is estimated and the stationary and dynamic sensor error can thus be corrected. This is particularly advantageous in dynamic operation (conditioning unit (incl. measuring sensor) is not in the steady state), as it has not been possible until now. In the stationary case, the correction of the sensor error is reduced to zero-point adjustment and calibration.

The modeled actual value of the controlled variable determined in this way can then be used in control of the controlled variable in a conditioning unit of a reactant of a fuel cell.

BRIEF DESCRIPTION OF THE DRAWINGS

The present invention is described in greater detail in the following with reference to FIGS. 1 to 3, which show exemplary, schematic and non-limiting advantageous embodiments of the invention. In the drawings.

DETAILED DESCRIPTION

The invention is explained in the following with reference to FIG. 1 without restricting the generality, using the example of a test bench 1 for a proton exchange membrane fuel cell (PEMFC) 2. Of course, the fuel cell 2 could also be used as an electrical power supply in a machine or system, or could also be of another type. The conditioning and control therefor would then be implemented in this machine or system. When reference is made in the following to the operation of a fuel cell 2, this is therefore always understood to mean the operation of the fuel cell 2 on a test bench 1 and the actual operation of the fuel cell 2 in a machine or system. Frequently, only one fuel cell stack is arranged on the test bench 1, which is also understood to be a fuel cell 2 within the meaning of the invention.

Figure 1:
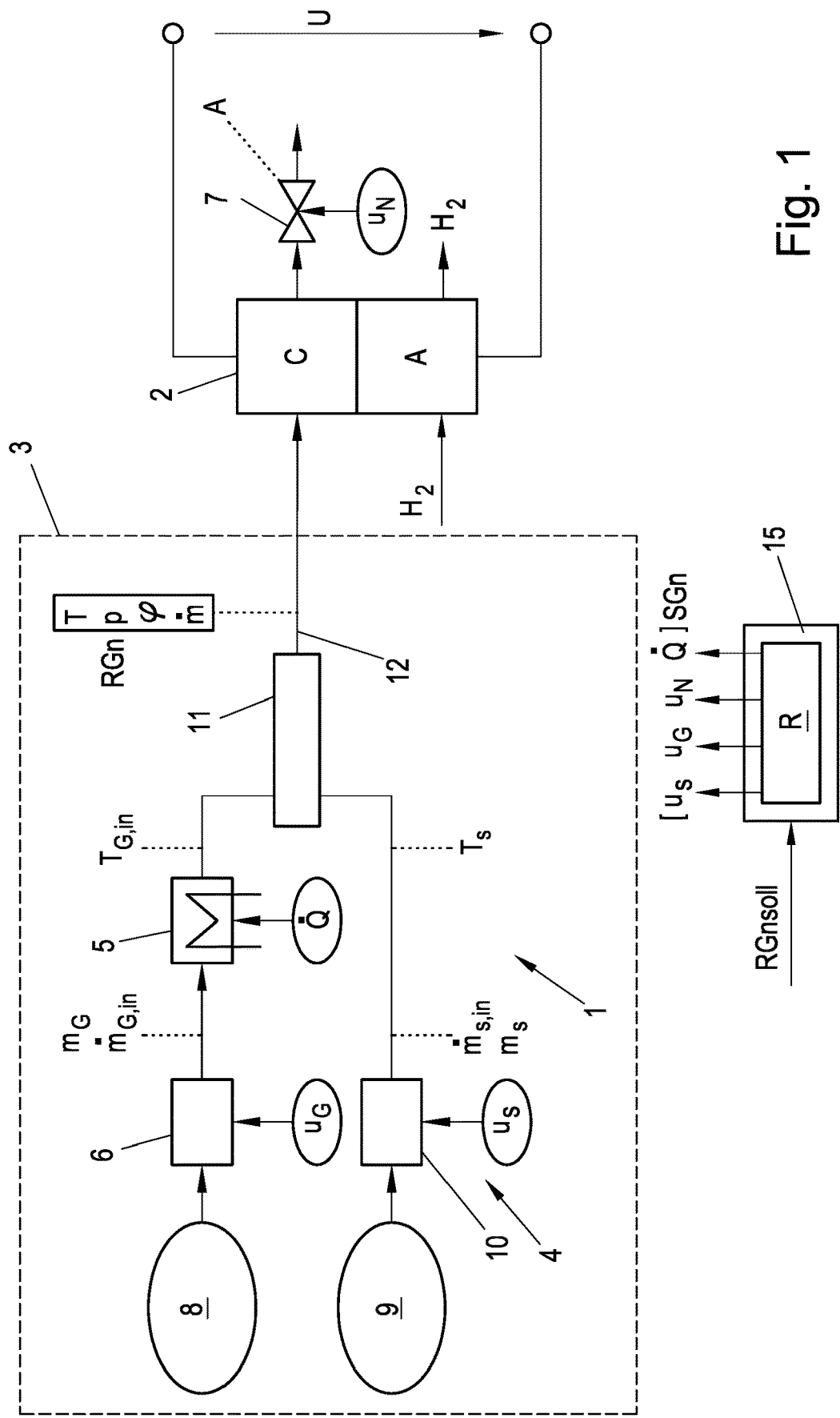
FIG. 1 shows a conditioning unit for a reactant of a fuel cell.

In the example shown in FIG. 1, the PEMFC fuel cell 2 is arranged on the test bench 1 and is operated on the test bench 1. As is sufficiently known, the fuel cell 2 comprises a cathode C, which is supplied with a first reaction gas, for example oxygen, also in the form of air, as the first reactant, and an anode A, which is supplied with a second reaction gas, for example hydrogen $H_2$, as the second reactant. The two reaction gases are separated from one another inside the fuel cell 2 by a polymer membrane. An electrical voltage U can be tapped between the cathode C and anode A. This basic structure and the function of a fuel cell 2 are well known, which is why there is no need to discuss this in greater detail here.

At least one reactant, usually the oxygen-carrying reactant, in particular air, is conditioned in a conditioning unit 3. A number n≥1 of control variables RGn for the conditioning, for example the pressure p, the relative humidity φ, the temperature T and the mass flow ṁ of the conditioned reaction gas, are set in the conditioning unit 3—these four exemplary controlled variables RGn are shown in FIG. 1 at the input of the cathode C. In the same way, the reactant on the anode side could of course also be conditioned. "Conditioning" means that the value of the at least one controlled variable RGn is controlled to a predetermined setpoint value of the controlled variable RGnsoll by a controller R in that in each time step of the control for at least one actuator An a manipulated variable SGn for the controlled variable RGn to be controlled with the actuator is calculated and set on the actuator An.

A corresponding actuator An is therefore provided in the conditioning unit 3 to control a controlled variable RGn. For example, a humidifying device 4 for humidifying the reactant for setting a relative humidity φ of the reactant, a temperature-control device 5 for temperature-controlling the reactant for setting a temperature T of the reactant, a mass-flow control device 6 for controlling the mass flow ṁ of the reactant, and a pressure-control device 7 for controlling the pressure p of the reactant are provided as actuators An.

Of course, there is also a source 8 for the at least one reactant, which is connected to the conditioning unit 3 or is likewise arranged in the conditioning unit 3. The source 8 is, for example, a pressure accumulator with compressed, dry reactant, for example air. Alternatively, when air is used, ambient air can also be processed, for example filtered, compressed, dried, etc., as the gas source 8.

The temperature-control device 5 is, for example, an electrical heating and cooling device or a heat exchanger. A device as described in AT 516 385 A1 can also be used as the temperature-control device 5.

In this embodiment, the humidifying device 4 comprises a water-vapor generator 9, a mass-flow controller 10 for the water vapor, and a mixing chamber 11. Conventional, suitable, commercially available, controllable mass-flow controllers can be used as the mass-flow controller 10 for the water vapor and also as the mass-flow control device 6 for the reactant. In the mixing chamber 11, the water vapor is mixed with the gas originating from the source 8 to form the conditioned reactant for the fuel cell 2.

Of course, other designs of a humidifying device 4 are also conceivable. For example, water could be supplied, e.g. injected, to the gas from the source 8.

In this example, a back pressure valve on the exhaust-gas side, i.e. downstream of the fuel cell 2, is used as the pressure-control device 7, which adjusts the pressure p of the reactant by means of the controllable opening cross section. The back pressure valve 7 is arranged in the gas conditioning unit 3 downstream of the fuel cell 2. This makes it possible to control the pressure upstream of the fuel cell 2, such that the pressure control is not influenced by any pressure losses in the other components of the gas conditioning unit 3.

Downstream of the mixing chamber 11, the reactant is provided in a reactant line 12, which is connected to the fuel cell 2, i.e. to the cathode C or anode A of the fuel cell 2, with the desired controlled variables RGn, for example a specific temperature T, a specific relative humidity φ, a specific pressure p and/or a specific mass flow ṁ.

This structure of a conditioning unit 3 described with reference to FIG. 1 is only exemplary and of course other configurations of the conditioning unit 3, and also other specific designs of the actuators An, here the humidifying device 4, mass-flow control device 6, temperature-control device 5 and pressure-control device 7, are possible and conceivable. In particular, fewer or more or other controlled variables RGn of the reactant could be controlled in the conditioning unit 3, for which fewer or more or other actuators An could be provided.

In order to be able to control the at least one controlled variable RGn, the associated actuator An, for example the humidifying device 4, mass-flow control device 6, temperature-control device 5 and pressure-control device 7, as shown in FIG. 1, can be controlled by means of a relevant manipulated variable SGn. The manipulated variables SGn are calculated by a control unit 15, in which a controller R is implemented, such that the actual value of the controlled variable RGnist follows the predetermined setpoint value RGnsoll. In the embodiment shown in FIG. 1, the humidifying device 4 is controlled by means of the mass-flow controller 10 for the water vapor using the manipulated variable $u_s$, the mass flow controller 6 is controlled using the manipulated variable $u_G$, the temperature-control device 5 is controlled using the manipulated variable $\dot{Q}$, and the pressure-control device 7 is controlled using the manipulated variable $u_N$. The manipulated variable SGn is used to actuate the relevant actuator An and to set the actuator An in order to bring about the desired change in the controlled variable RGn.

Figure 2:
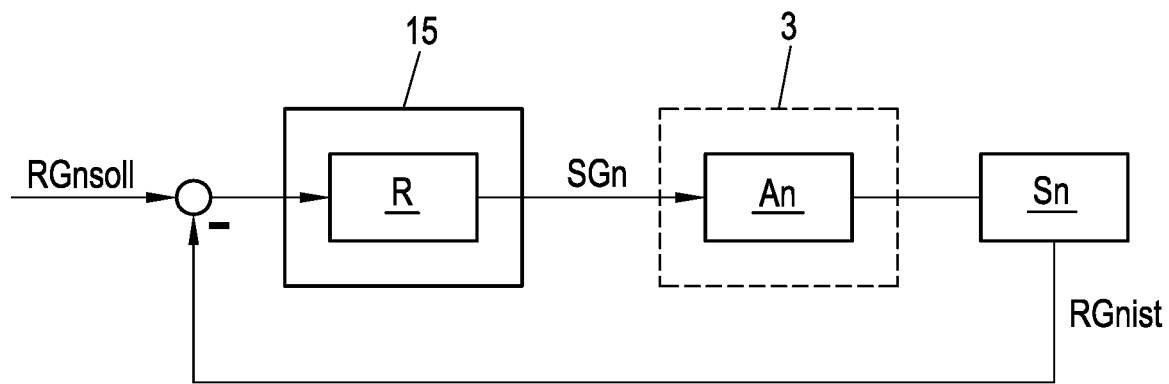
FIG. 2 shows control of a controlled variable of the reactant.
Figure 3:
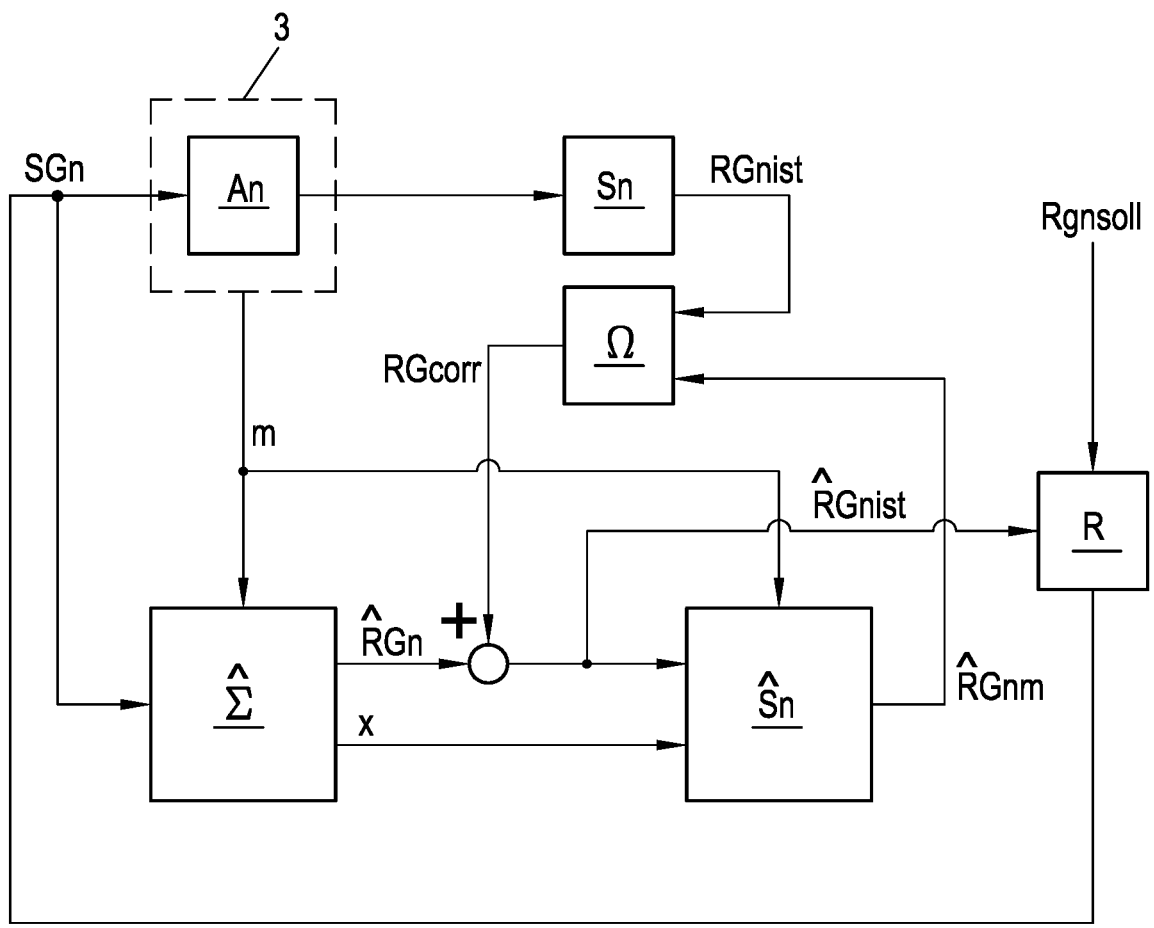
FIG. 3 shows the determination of a modeled actual value of the controlled variable of the reactant for the control thereof.

For the control of the controlled variable RGn, an actual value of the controlled variable RGnist is also required in order to compensate the deviation between the actual value of the controlled variable RGnist and the setpoint value of the controlled variable RGnsoll by means of the controller R. For example, the difference between the setpoint value of the controlled variable RGnsoll and the actual value of the controlled variable RGnist is supplied to the controller R, which uses the implemented control law to calculate a manipulated variable SGn therefrom that is set using the associated actuator An in the conditioning unit 3, as shown in FIG. 2. The actual value of the controlled variable RGnist is measured by a measuring sensor $\hat{S}n$, which is of course arranged at a suitable point in the conditioning unit 3, for example in the reaction-gas line 12. The measuring sensor $\hat{S}n$ does not have to measure the controlled variable RGn directly, but can also measure a measured value that is representative of the controlled variable RGn. This measurement is often subject to the restrictions mentioned at the outset. In order to improve the quality of the measurement of the actual value of the controlled variable RGnist, the measured value detected by the measuring sensor $\hat{S}n$ is therefore not used directly for the control according to the invention, but instead a corrected measured value is used, as will be explained in the following with reference to FIG. 3.

From a suitable model $\hat{\Sigma}$ of the conditioning unit 3, to which the manipulated variable SGn is supplied, the new controlled variable $\hat{R}Gn$ is calculated in response to the manipulated variable SGn. Other manipulated variables of the conditioning unit 3 can also be supplied to the model $\hat{\Sigma}$ if more actuators An are contained in the conditioning unit 3 and if required by the model $\hat{\Sigma}$. Likewise, required measured values m of the conditioning unit 3 can also be supplied to the model $\hat{\Sigma}$. A suitable sensor model $\hat{S}n$ calculates a model value $\hat{R}Gnm$ for the measured value of a controlled variable RGn from the controlled variable $\hat{R}Gn$. For this purpose, the sensor model $\hat{S}n$ can, if necessary, also be provided with state variables x of the conditioning unit 3, which can likewise be calculated in the model $\hat{\Sigma}$. The actual value of the controlled variable RGnist detected by the measuring sensor Sn and the model value $\hat{R}Gnm$ calculated using the sensor model $\hat{S}n$ are supplied to a correction unit $\Omega$ in which a correction value RGcorr of the controlled variable RG is calculated. The sum of the correction value RGcorr, having the correct sign, and the controlled variable $\hat{R}Gn$ calculated in the model $\hat{\Sigma}$ of the conditioning unit 3 is used as the modeled actual value of the controlled variable $\hat{R}Gnist$ for the control. The modeled actual value of the controlled variable $\hat{R}Gnist$ is also supplied to the sensor model $\hat{S}n$ to calculate the model value $\hat{R}Gnm$ of the controlled variable RGn therefrom.

The model $\hat{\Sigma}$ of the conditioning unit 3, the sensor model $\hat{S}n$ and the correction unit $\Omega$ can, for example, be implemented in the control unit 15 as suitable software, but they can of course each be implemented individually or together as suitable hardware and/or software.

This procedure of detecting the actual value of the controlled variable RGnist for the control is particularly suitable for the relative humidity $\varphi$ of the conditioned reactant, but can also be used for other controlled variables RGn such as the pressure p, the temperature T or the mass flow $\dot{m}$.

The conditioning unit 3 according to FIG. 1 could, for example, be modeled by the mathematical, physical model $\hat{\Sigma}$ described in the following, although other models, including trained models, can of course also be used.

An exemplary model $\hat{\Sigma}$ for the conditioning unit 3 is given below:

From the mass balance in the mixing chamber 11 results $$\frac{d}{dt}m_G = \dot{m}_{G,in} - \dot{m}_{G,out}$$

$$\frac{d}{dt}m_S = \dot{m}_{S,in} - \dot{m}_{S,out},$$

containing the mass $m_G$ of the gas, the mass flow of the gas $\dot{m}_{G,in}$ into the mixing chamber 11, the mass flow of the gas $\dot{m}_{G,out}$ out of the mixing chamber 11, the mass flow of the water vapor $\dot{m}_{s,in}$ into the mixing chamber 11 and the mass flow of the water vapor $\dot{m}_{s,out}$ out of the mixing chamber 11. The mass flow of gas and water vapor out of the mixing chamber 11 is given by $$\dot{m}_{G,out} = \frac{m_G}{m}\dot{m}, \ \dot{m}_{S,out} = \frac{m_S}{m}\dot{m},$$

containing the total mass m in the conditioning unit 3 and the masses $m_G$ of the gas and $m_s$ of the water vapor and the mass flow of the reactant $\dot{m}$. Of course, $m = m_G + m_s$ must apply.

From the energy balance of the conditioning unit 3 follows $$\frac{dU}{dt} = \dot{m}_{G,in} \cdot h_{G,in} + \dot{m}_{S,in} \cdot h_{S,in} - \dot{m} \cdot h$$

$$\frac{dU}{dt} = \frac{d}{dt}(m_G u_{iG} + m_S u_{iS}).$$

Here, U denotes the internal energy and h denotes the specific enthalpy of the gas (here and below marked by index G), of the water vapor (here and below marked by index S) and of the reactant (here and below without index) downstream of the mixing chamber 11 and $u_i$ denotes the specific internal energy of the gas and the water vapor. The specific enthalpy h of a gas is known to be the product of the specific heat capacity $c_p$ at constant pressure and the temperature T of the gas. With water vapor, the latent heat $r_0$ is additionally added. The internal energy $u_i$ of a gas is the product of the specific heat capacity $c_v$ at constant volume and the temperature T of the gas. With water vapor, the latent heat $r_0$ is additionally added. If all of this is put into the energy balance and taking into account the mass balance, the following system equation results, which describes the temperature dynamics of the conditioning unit 3.

$$\frac{d}{dt}T = \frac{1}{m_G c_{vG} + m_S c_{vS}} \cdot \cdot \left( \dot{m}_{G,in} c_{pG} T_{G,in} + \dot{m}_{S,in}(c_{pS} T_{S,in} + r_0) - \frac{1}{m} \right.$$
$$\left. \dot{m}(m_G c_{pG} T + m_S(c_{pS} T + r_0)) - \frac{d}{dt}m_G c_{vG} T - \frac{d}{dt}m_S(c_{vS} T + r_0) \right)$$

From the thermodynamic equation of state for an ideal gas follows $$pV = (m_G R_G + m_s R_s)T$$

containing the pressure p and the temperature T at the input of the fuel cell 2. R denotes the gas constant for gas (index G), water vapor (index S) or for the reactant (without index) in a known manner. The volume V preferably designates not only the volume of the mixing chamber 11, but also the volumes of the pipework in the conditioning unit 3. The pressure p and the mass flow $\dot{m}$ of the reactant are also significantly influenced by the back pressure valve 7, which can be modeled as follows.

$$\dot{m} = A \cdot p \sqrt{\frac{2}{RT}} \cdot \psi$$

$$\psi = \sqrt{\frac{\kappa}{\kappa-1}\left[\left(\frac{p_0}{p}\right)^{\frac{2}{\kappa}} - \left(\frac{p_0}{p}\right)^{\frac{\kappa+1}{\kappa}}\right]}, \kappa = \frac{c_p}{c_v}$$

Therein, A denotes the opening cross section of the back pressure valve 7 and po denotes the ambient pressure.

The relative humidity $\varphi$ is modeled by $$\varphi = \frac{X}{\frac{R_G}{R_S} + X} \cdot \frac{p}{p_W(T)}, X = \frac{m_S}{m_G}$$

where $p_w(T)$ denotes the saturation partial pressure, which is given, for example, by $$p_W(T) = p_m \cdot e^{\frac{C_1 T}{C_2 + T}}.$$

The parameters $p_m$, $C_1$, $C_2$ can be found, for example, in Plant R. S. et al., "Parameterization of Atmospheric Convection," Vol. 1, Imperial College Press, 2015. In addition, the dynamics of the actuators An can be modeled depending on the manipulated variables $u_s$, $u_G$, $\dot{Q}$ and $u_N$ in the form of 1st order delay elements having the time constants $\tau_1$, $\tau_2$, $\tau_3$, $\tau_4$, $$\frac{d}{dt}\dot{m}_{G,in} = \frac{1}{\tau_1}(u_G - \dot{m}_{G,in})$$

$$\frac{d}{dt}T_{G,in} = \frac{1}{\tau_2}\frac{1}{c_{pG}\dot{m}_{G,in}}\left(\frac{\dot{Q}}{\dot{m}_{G,in}} - c_{pG}(T_{G,in} - T_{G,0})\right)$$

$$\frac{d}{dt}\dot{m}_{S,in} = \frac{1}{\tau_3}(u_s - \dot{m}_{S,in})$$

$$\frac{d}{dt}A = \frac{1}{\tau_4}(u_N - (A - A_0)).$$

Therein, $T_{G,0}$ and $A_0$ are predetermined offset variables.

From the system equations above, it can be seen that a non-linear multi-variable system (MIMO, multiple input multiple output) system having the form $$\dot{x} = f(x) + \sum_{i=1}^{n} g_i(x)SG_i$$

$$RG = h(x)$$

is present, with the system functions f(x), g(x), h(x) which result from the above modeling, the state vector x, a manipulated-variable vector SG having the manipulated variables SGn and a controlled-variable vector RG having the controlled variables RGn as follow owing:

$$x = \begin{pmatrix} m_G \\ m_S \\ T \\ \dot{m}_{G,in} \\ T_{G,in} \\ \dot{m}_{S,in} \\ A \end{pmatrix}, SG = \begin{pmatrix} u_G \\ \dot{Q} \\ u_S \\ u_N \end{pmatrix}, RG = \begin{pmatrix} T \\ p \\ \varphi \\ \dot{m} \end{pmatrix}.$$

For better understanding, FIG. 1 indicates where each of these variables occur in the conditioning unit 3.

The correction unit Ω calculates the correction value RGcorr from the deviation between the actual value of the controlled variable RGnist measured using the measuring sensor Sn and the model value R̂Gnm for the measured value of the controlled variable RGn calculated using the sensor model Ŝn. In the simplest case, the difference between these two values can simply be used as the correction value RGcorr. In the correction unit Ω, however, a controller, for example a PI controller, can also be implemented which compensates this difference, i.e. controls it towards zero. However, more complex (for example, model-based) control methods can also be used in the correction unit Ω.

A simple dynamic sensor model Ŝn would be, for example, a known simple 1st order delay element (PT1 element) which e.g. takes into account the sensor inertia (known from data from the measuring sensor Sn or from measurements using the measuring sensor Sn) when a controlled variable RGn of the reactant changes, for example the humidity $\varphi$. Couplings (for example at the system pressure p) can also be taken into account in the sensor model Ŝn. This can either take place using dynamic models or, in a simpler configuration, can be implemented as stationary correction factors or in the form of characteristic maps.

By modeling the measuring sensor Ŝn using a dynamic sensor model Ŝn, the dependency of the measuring sensor Ŝn on environmental conditions, such as pressure, humidity, mass flow, temperature, and thus also the sensor error in transient behavior, can be represented. For this purpose, it may be advantageous to take state variables x of the conditioning unit 3 into account in the sensor model Ŝn. These sensor errors are corrected by the correction unit Ω. In particular, it is therefore also not necessary to calibrate the measuring sensor Sn in the conditioning unit 3 for all environmental conditions, since the sensor error is compensated for in the calculated actual value of the controlled variable R̂Gnist, which is used for controlling the controlled variable RGn.

It is also possible to carry out explicitly time-dependent modeling of the dynamic sensor model Ŝn. The change in sensor behavior (e.g. the dynamics) over time could thus also be taken into account, i.e. the effects of aging, for example.

The invention claimed is:

1. A method for determining an actual value of at least one controlled variable of a conditioning unit for a reactant of a fuel cell, the method including the following steps:

measuring a measured value of the actual value of the at least one controlled variable using a measuring sensor;

calculating a model value of the at least one controlled variable using a model of the conditioning unit;

calculating a model value of the actual value of the at least one controlled variable using a sensor model for the measuring sensor;

calculating a correction value for the at least one controlled variable from the actual value of the at least one controlled variable measured using the measuring sensor and from the model value of the actual value of the at least one controlled variable calculated with the sensor model;

calculating the actual value of the at least one controlled variable as the sum of the correction value and of the model value of the at least one controlled variable calculated with the model of the conditioning unit; and wherein the sensor model uses the actual value of the controlled variable to calculate the model value of the actual value of the at least one controlled variable.

2. The method according to claim 1, further including the step of processing in the model of the conditioning unit measured variables measured in the conditioning unit.

3. The method according to claim 1, further including the steps of calculating state variables of the conditioning unit using the model of the conditioning unit and processing the state variables in the sensor model.

4. The method according to claim 1, further including the steps of compensating for a deviation between a setpoint value of the at least one controlled variable and an actual value of the at least one controlled variable; and using the actual value of the controlled variable to control the at least one controlled variable of the conditioning unit of the reactant of the fuel cell.

5. A system for controlling a controlled variable of a reactant of a fuel cell in a conditioning unit for the reactant, the system comprising:

a measuring sensor configured and arranged to measure a measured value of an actual value of the controlled variable; and a control unit including, the control unit configured and arranged to compensate for a deviation between a setpoint value of the controlled variable and the actual value of the controlled variable, use a model of the conditioning unit to calculate a model value of the controlled variable, and use a sensor model, for the measuring sensor, which calculates a model value of the actual value of the controlled variable;

a correction unit configured and arranged to calculate a correction value for the controlled variable from the actual value of the controlled variable measured using the measuring sensor and from the model value of the actual value of the controlled variable calculated using the sensor model; and wherein the controller is configured and arranged to use the sum of the correction value and the model value of the controlled variable calculated using the model of the conditioning unit as the actual value of the controlled variable, wherein the sensor model also uses this modeled actual value of the controlled variable to calculate the model value of the actual value of the controlled variable.

6. The system of claim 5, wherein the controller is further configured and arranged to calculate a manipulated variable from the actual value of the controlled variable and the system further comprising an actuator for the at least one controlled variable wherein the actuator is configured and arranged to be controlled with the manipulated variable.

7. The system of claim 6, wherein the controlled variable consists of: humidity, temperature, pressure, or mass-flow of the reactant.

8. A method for determining an actual value of at least one controlled variable of a conditioning unit for a reactant of a fuel cell, the method including the following steps:

measuring a measured value of the actual value of the at least one controlled variable using a measuring sensor;

calculating a model value of the at least one controlled variable using a model of the conditioning unit;

calculating a model value of the actual value of the at least one controlled variable using a sensor model for the measuring sensor;

calculating a correction value for the at least one controlled variable from the actual value of the at least one controlled variable measured using the measuring sensor and from the model value of the actual value of the at least one controlled variable calculated with the sensor model;

calculating the actual value of the at least one controlled variable as the sum of the correction value and of the model value of the at least one controlled variable calculated with the model of the conditioning unit; and calculating a manipulated variable from the actual value of the at least one controlled variable to control an actuator for the at least one controlled variable;

wherein the sensor model uses the actual value of the controlled variable to calculate the model value of the actual value of the at least one controlled variable.

9. The method of claim 8, wherein the at least one controlled variable includes one or more of the following: humidity, temperature, pressure, and mass-flow of the reactant of the fuel cell.

* * * * *